INTERFERENCE TECHNIQUE AND APPARATUS FOR SPECTRUM ANALYSIS

Original Filed June 29, 1961

United States Patent Office

Re. 27,947
Reissued Mar. 26, 1974

27,947
INTERFERENCE TECHNIQUE AND APPARATUS FOR SPECTRUM ANALYSIS

Lawrence N. Mertz, Lexington, Mass., by Block Engineering, Inc., Cambridge, Mass., assignee Original No. 3,286,582, dated Nov. 22, 1966, Ser. No. 120,600, June 29, 1961. Application for reissue Aug. 16, 1971, Ser. No. 172,330
Int. Cl. G01b 9/02
U.S. Cl. 356—106 S 19 Claims

Matter enclosed in heavy brackets [ ] appears in the original patent but forms no part of this reissue specification; matter printed in italics indicates the additions made by reissue.

The field of this invention is that of optical spectrum analysis more particularly to the use of interference techniques for this purpose.

Interferometry as applied to spectroscopy in general possesses several distinct advantages over conventional dispersive techniques, such as those using prisms and gratings, for obtaining information as to energy distribution within the spectrum. Principal among these advantages are greatly increased sensitivity, since light from the source under examination is not scattered, and increased resolution. Heretofore, however, interferometry has not been particularly favored as a tool for spectral analysis because of certain intrinsic difficulties in data reduction. Primarily, these difficulties flow from the fact that the brightness or intensity function obtained directly from the operation of an interferometer is not a representation of the source energy distribution but is rather a representation of a function, the inverse Fourier transform of which represents that energy distribution.

Previously, special analysis by interferometric techniques was carried out by slowly changing the relative lengths of interfering light paths, for example by displacing a mirror in a conventional Michelson interferometer, and measuring the intensity of the interference fringes thereby produced as a function of path difference. This function, obtained in the form of a single interferogram, was then transformed either by laborious hand calculation or by programming a relatively elaborate computer, to yield the energy profile. A chopper has to be used in the light path in order to obtain an A.C. signal that can be practically handled.

Objects of the present inventions are to provide a technique of spectral analysis by interferometry which permits the obtaining of an energy distribution profile without the above mentioned difficulties especially extensive calculation, and which yields high sensitivity and high resolution with a minimum of effort but high accuracy for all purposes including the gathering of spatial information and the observation of rapidly fluctuating sources; to provide apparatus for spectral analysis which is simple and rapid in operation, which is of compact and light weight construction, which is relatively inexpensive, which will operate with all types of, including weak or unsteady light sources, which is highly reliable and which does not require an elaborate or expensive optical system.

The substance and nature of the invention can be summarized in characteristic aspect as follows.

Light from a source to be examined is passed through an interferometer that permits the varying of the difference between the two interfering light paths within the interferometer [for example] by means of a movable mirror. By doing this at a constant transposition velocity, a fluctuating light output can be obtained which is a linear representation of the variation in time of the intensity of fringes, as opposed to the displacement or path difference function mentioned above with reference to conventional spectroscopy. This time function is characteristically made up of component frequencies, the amplitudes of which are representative of the energy distribution of the source light among corresponding wavelengths. The correspondence between the component frequencies in the light output and the wavelengths of the source light *is* dependent upon the particular transposition velocity at which the path difference is varied, such as by moving a mirror or other optical instrumentality.

By choosing the transposition velocity so that the component frequencies are within the range of frequencies that can be conveniently handled by conventional electronic equipment as, for example, the audio frequency range, and by repeating the movement such as that of a mirror, an output signal can be obtained by way of a photoelectric detector, and analyzed with a conventional electronic frequency analyzer. The frequencies involved are such that optical chopping for producing an alternating current signal is unnecessary. The spectrum obtained in terms of audio frequencies is then an accurate representation of the optical spectrum desired the correspondence of these audio frequencies with light wavelengths being determined by the transposition velocity used.

In a practically important embodiment of the invention the mirror of a Michelson type interference device is driven [sawtooth fashion] *with a substantially constant speed scan and a rapid return* by an electrodynamic motor and the output signal from the photoelectric pickup is first recorded on magnetic tape. A portion of the tape, typically a length containing the record of approximately twenty sweeps of the mirror, is then spliced into a loop and the loop is played back into a *heterodyne* frequency analyzer. This procedure allows the analysis to be performed at leisure without the necessity of maintaining the light source. Likewise, the availability of a continuous source of the component frequencies permits the electronic frequency analyzer to yield maximum resolution.

Apparatus according to a typical embodiment of the invention thus involves an interferometer having a reciprocal mirror and [photoelectric pickup] *detector* means in its light exit path, means for repetitively reciprocating the mirror in such manner that the velocity of the mirror is substantially constant for [an appreciable] *a major* portion of each cycle, and electronic frequency analyzer means.

These and other objects, and aspects of the substance and nature of the invention will appear from the herein presented outline of its principle and general mode of operation together wth a detailed description of practical embodiments illustrating its novel characteristics.

The description refers to a drawing in which

Figure 1:
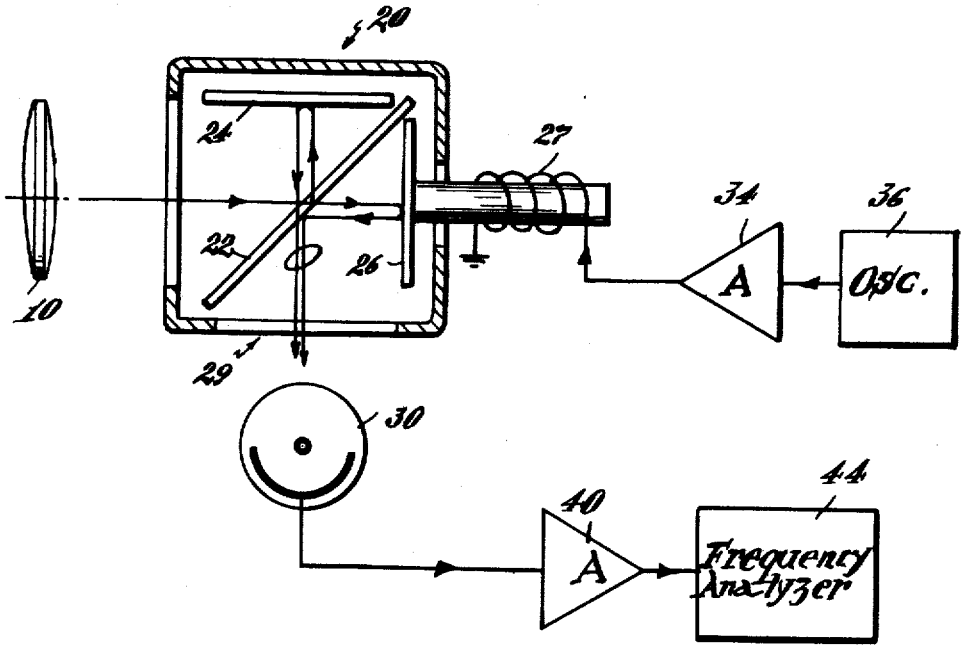
FIG. 1 is a schematic representation of interference spectrographical apparatus according to the invention.

FIG. 1 indicates a lens system 10 arranged to direct an extended field of light into an interferometer 20 in its general construction of conventional Michelson type. The interferometer has a beam splitter 22 tilted at an angle of 45° with respect to the path of the incident light. Mounted parallel to the path of the incident light and to one side of the beam splitter 22 is a fixed mirror 24. Behind the beam splitter 22 and facing the lens system 10 is a reciprocable mirror 26. The light exit aperture of the interferometer is indicated at 29 on the opposite side of the beam splitter 22 from the fixed mirror 24, and a photoelectric detecting device such as phototube 30 is placed in the exit path.

The reciprocable mirror 26 is precision mounted for movement by an electrodynamic motor 27 which is similar to the voice coil and magnet structure used in conventional cone-type loud speakers, an appropriately compliant suspension being provided for the mirror and coil. For driving the mirror there is provided for the mirror and coil. For driving the mirror there is provided an electronic power amplifier 34 controlled by a conventional saw-tooth oscillator 36 *preferably providing a constant velocity scan motion and a faster return motion.* By this means the slidable mirror 26 can be reciprocated in such a manner that the velocity of the mirror is substantially constant during the major portion of each cycle. In particular, the velocity will be substantially constant at that point in the mirror's travel which yields equal optical path lengths.

The electrical signal output of the photoelectric pickup 30 is amplified as indicated at 40, to a level suitable for analysis by [a] conventional electronic frequency [analyzer] *analysis means* indicated at 44.

The operation of the above described device is as follows. Light coming from the lens system 10 and incident on the beam splitter 22 is divided substantially equal between two paths one of which is deflected to the fixed mirror 24 and the other of which continues, in the same direction as the incident light, to the reciprocable mirror 26. In well-known fashion each of these half-beams is reflected by its respective mirror back to the beam splitter 22 where they interfere, and a portion of the total available light, the amount depending upon the relative path lengths, is directed into the photoelectric pickup 30. The field directed into the photocell corresponds to the central fringe of a circular interference pattern. As the mirror 26 reciprocates, the light emerging from the interferometer 20 fluctuates according to a time-energy function, the amplitude of whose component frequencies are, as explained previously, representative of the wavelength distribution of the incident light. In accordance with the invention, these components are selected by the proper choice of velocity for the reciprocating mirror 26, to fall within the range of frequencies conveniently handled by conventional electronic equipment. Accordingly, the composite electrical output signal from the photoelectric pickup 30 can be analyzed by conventional frequency analyzing apparatus 44. For analyzing the usual visual or infrared bands, mirror 26 travels such as 0.004 inch and 0.018 inch with scanning rates of 0.5 to 4 scans per second have been successfully used. It will be understood that these will depend greatly on the particular wavelengths and desired resolutions involved, the latter depending on the length of the mirror travel. The information obtained from the analyzer 44 as to the relative amplitudes of the various frequency components is directly representative of the amplitudes of the various wavelength components of the incident light.

Figure 3:
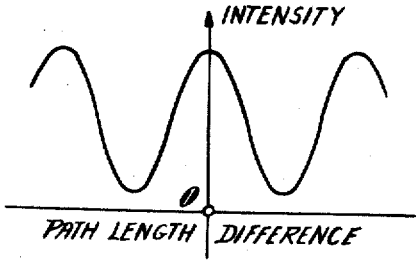
FIGS. 3 and 4 are diagrams illustrating [the method according to] the invention.
Figure 4:
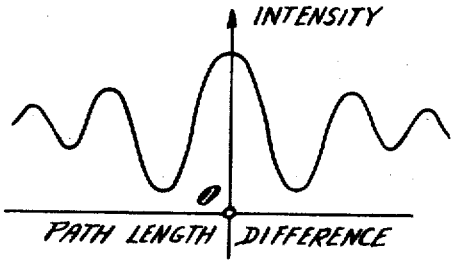

Spectrographic signals obtained from this interferometer as illustrated diagrammatically in FIGS. 3 and 4. If the incident light were truly monochromatic the output signal obtained from the photoelectric pick-up 30 would be sinusoidal over the entire constant velocity portion of the reciprocating mirror's travel as shown in FIG. 3. A typical use for this apparatus, however, is the derivation of the energy profile of a relatively broad band source and a somewhat simplified illustration of the signal obtained in such a case is shown in FIG. 4. This signal is symmetrical about that portion of its amplitude which corresponds to zero path difference between the portions of the incident light reflected from the fixed mirror 24 and from the reciprocable mirror 26. This signal is not a sine wave but rather the amplitudes of the fluctuations decrease with increasing path differences. This is because the output signal is a complex wave made up of many component frequencies corresponding to the various wavelength components present in the incident light, and these various frequencies are in phase only for zero path difference. The various components become more and more out-of-phase as the path difference increases in either direction until the cancellation becomes virtually complete and thus the visibility of the interference fringes and the amplitude of the corresponding voltage signal fluctuations also decrease.

Accordingly, if the sweep of the reciprocable mirror 26 passes far enough to either side of the point which corresponds to zero path difference, the fluctuations in the output signal from the photoelectric pickup 30 will drop to practically zero. Because of this feature, the period during which the mirror reverses direction and hence is not traveling at constant velocity has no appreciable effect on the amplitudes of the various frequency components of the output signal.

In a satisfactory working arrangement, the travel of the mirror takes place in conformity to a saw-tooth function, the return speed being about ten times as fast as the scanning speed. In many instances the high frequencies introduced into the output signal by the return travel will be outside the frequency range of the analyzer and can hence be disregarded. If a very large optical band width has to be covered, the return stroke can be blanked by conventional electronic apparatus. As an alternative, since the output signal is symmetrical around the point which represents zero path difference, the output signal produced during the sweep of the mirror in both directions can be utilized thereby avoiding any problems in switching.

Figure 2:
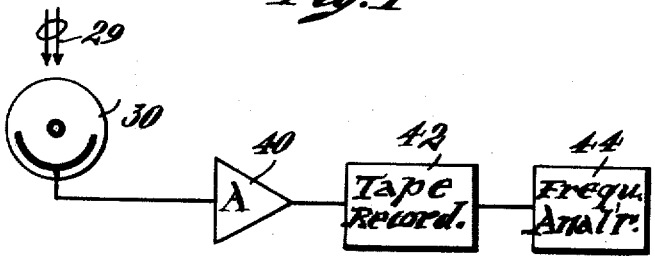
FIG. 2 illustrates, similarly to FIG. 1, a preferred embodiment of the invention incorporating a tape recorder.

FIG. 2 illustrates a modified, preferred embodiment of the invention in which a tape recorder 42 is interposed between the photoelectric pickup 30 and the electronic frequency analyzer 44. As pointed out above, if the output signal from the photoelectric pickup is recorded on magnetic tape and a portion of the recording is spliced into a loop, analysis of the component frequencies can be performed at leisure and convenience, and over a longer time than the light source can be maintained. Also, the range of frequencies presented to the analyzer can be expanded or condensed by playing the tape back at a different speed from that at which it was recorded. A further control of this range of frequencies can be obtained by varying the velocity at which the reciprocating mirror 26 makes its sweeps. This transposition velocity control can be accomplished by adjusting the frequency produced by the saw-tooth oscillator 36.

While the tape recorder 42 is indicated as a single unit it should be understood that separate recording and play back facilities can be used. This is especially true in the preferred practice of the invention in which the tape is transformed into a loop before being played back into the electronic frequency analyzer 44. In a typical embodiment, a loop of 15 to 20 interferograms constitutes a convenient size and the noise generated by the tape splice is not objectionable with that number of interferograms.

Panoramic wave analyzers can be used either operated directly from the interferometer or from the tape recorder. In this manner graphs of the spectrum can be immediately produced. If only particular wavelengths are of interest, such can be separated by means of electrical band pass filters.

Because this device does not depend upon the use of narrow slits to obtain high resolution but has an effective aperture equal to the size of the smallest mirror, its sensitivity is correspondingly greater than that of conventional, dispersive types of spectrometers using prisms or gratings. An increase in sensitivity by a factor of one thousand can be easily obtained. A further advantage of this device over comparably elaborate instruments of the dispersive type is its increased resolution. This advantage flows from the nature of the interferometric process in which the phenomenon detected is not a function of a single wavelength but rather a function to which all of the wavelength components contribute simultaneously; in other words, all of the wavelengths are measured at the same time.

The simultaneous measurement of all wavelengths which is characteristic of the technique according to the invention leads to two further advantages. The first is that, if the light source fluctuates in intensity even more rapidly than the mirror oscillates, the energy profile or spectrum obtained will still be of the proper relative shape and only the fine resolution will be affected. Secondly, the signal-to-noise ratio is improved because the time over which each wavelength is measured is much greater than in equipment in which each wavelength is measured separately.

It should be understood that the present disclosure is for the purpose of illustration only and that this invention includes all modifications and equivalents which fall within the scope of the appended claims.

I claim:

[1. The method of optical spectrum analysis with an interefrometer having a reciprocable mirror and having photoelectric detecting means in its light exit path, comprising the steps:

directing light within an appreciable spectral range of optical frequencies from a source to be examined through the interferometer;

reciprocating the mirror with substantially constant velocity over an appreciable portion of each reciprocating cycle, at an excursion, and at a repetition rate to produce fluctuating light amplitude outputs at frequencies related to the component optical frequencies contained in the source of light to be examined;

directing said fluctuating light amplitude outputs on to said photoelectric detecting means; and analyzing the amplitude of each frequency component of the output signal obtained from said photoelectric detecting means during that portion of each reciprocating cycle during which the velocity of the mirror is substantially constant to provide an indication of the intensities of the various frequency components within the spectral range of said source, and indicating the distribution of the optical energy of said light source among the various corresponding wavelengths corresponding to said various frequency components.]

[2. The method of optical spectrum analysis with an interferometer having a reciprocable mirror and having photoelectric detecting means in its light exit path, comprising the steps:

directing light within an appreciable spectral range of optical frequencies from a source to be examined through the interferometer;

reciprocating the mirror with a substantially constant velocity over an appreciable portion of each reciprocating cycle, at an excursion, and at a repetition rate to produce fluctuating light amplitude outputs at frequencies related to the component optical frequencies contained in the source of light to be examined;

directing said fluctuating light amplitude outputs on to said photoelectric detecting means;

recording the output signal from said photoelectric detecting means during that portion of each reciprocating cycle during which the velocity of the mirror is substantially constant; and playing back repetitively the signal so recorded into frequency analyzer means to provide an indication of the intensities of the various frequency components within the spectral range of said source, and indicating the distribution of optical energy among the various corresponding wavelengths.]

[3. The method of optical spectrum analysis with an interferometer having a reciprocable mirror and having photoelectric detecting means in its light exit path, comprising the steps:

directing light within an appreciable spectral range of optical frequencies from a source to be examined through the interferometer;

reciprocating the mirror with a substantially constant velocity over an appreciable portion of each reciprocating cycle, at an excursion, and at a repetition rate to produce fluctuating light amplitude outputs at frequencies related to the component optical frequencies contained in the source of light to be examined;

directing said fluctuating light amplitude outputs on to said photoelectric detecting means;

recording on a tape a representation of the electrical output signal from said photoelectric pick-up during that portion of each reciprocating cycle during which the velocity of the mirror is substantially constant;

splicing said tape into a loop; and playing back said tape recording loop into a frequency analyzer to provide an indication of the intensities of the various frequency components within the spectral range of said source indicating the distribution of optical energy among the various corresponding wavelengths.]

4. Spectrum analysis apparatus comprising:

an optical interferometer including a reciprocable mirror and having a light exit path;

means for reciprocating said mirror with an excursion exceeding the longest wavelength of the light in said exit path and with a substantially constant velocity over [an appreciable] *a major* portion of each reciprocating cycle;

photoelectric pick-up means located in the light exit path of said interferometer for generating a signal proportional to the output in said exit path; and electronic frequency analyzer means coupled to and supplied with said signal, for measuring the amplitudes of the various component frequencies making up the output signal from said photoelectric pick-up means;

whereby the distribution of the amplitude of the signal among its various frequency components indicates the distribution of the optical energy of the given light source among the various corresponding wavelengths.

5. Spectrum analysis apparatus comprising:

an optical interferometer including a reciprocable mirror and having a light exit path;

means for reciprocating said mirror with an excursion exceeding the longest wavelength of the light in said exit path and with a substantially constant velocity over [an appreciable] *a major* portion of each reciprocating cycle;

photoelectric pick-up means located in the light exit path of said interferometer for generating a signal proportional to the output in said exit path;

electronic recording means connected to said pick-up means and supplied with said signal, said recording means including record carrying means and playback means; and frequency analyzer means coupled to and receiving signals derived from said record carrying means, for measuring the amplitudes of the various component frequencies making up the recorded output signal from said photoelectric pick-up means thereby to provide an indication of the amplitude distribution of the signal among its various frequency components which distribution indicates the distribution of the optical energy of a given light source among its various corresponding wavelengths.

*6. Spectrum analysis apparatus comprising*

*a Michelson interferometer including a continuously reciprocable mirror and having a light exit path;*

*means for continuously reciprocating said mirror with an excursion exceeding the longest wavelength of the light in said exit path and with a substantially con-*

*stant velocity over a major portion of each reciprocating cycle;*

*detector means located in the light exit path of said interferometer for generating a signal in response to the output in said exit path; and*

*electronic frequency analyzer means responsive to said signal, for measuring the amplitude of the various component frequencies making up the output signal from said detector means.*

*7. The spectrum analysis apparatus as claimed in claim 6 wherein said means for reciprocating includes means for providing a scanning motion at a first velocity and a return motion at a second velocity, said second velocity being greater than said first velocity.*

*8. The spectrum analysis apparatus as claimed in claim 7 wherein said means for reciprocating provides a second velocity approximately ten times as great as said first velocity.*

*9. The spectrum analysis apparatus as claimed in claim 6 wherein said means for continuously reciprocating said mirror comprise a linear electrodynamic motor.*

*10. The spectrum analysis apparatus as claimed in claim 6 wherein said means for reciprocating provides a speed of said reciprocable mirror during said constant velocity portion of the reciprocating cycle which is at least 0.06 mm. per second, providing an A.C. signal without chopping.*

*11. Spectrum analysis apparatus comprising:*

*a Michelson interferometer including a continuously reciprocable mirror and having a light exit path;*

*means for continuously reciprocating said mirror so that each reciprocating cycle has (a) an excursion exceeding the longest wavelength of light in said exit path, and (b) a substantially constant velocity over a major portion of the reciprocating cycle;*

*detector means located in the light exit path of said interferometer for generating a signal in response to the output in said exit path; and*

*means for frequency analysis responsive to said signal, for measuring the amplitude of the various component frequencies making up the output signal from said detector means.*

*12. The spectrum analysis apparatus as claimed in claim 11 wherein said means for reciprocating includes means for providing a scanning motion at a first velocity and a return motion at a second velocity, said second velocity being greater than said first velocity.*

*13. The spectrum analysis apparatus as claimed in claim 12 wherein said means for reciprocating provides a second velocity approximately ten times greater than said first velocity.*

*14. The spectrum analysis apparatus as claimed in claim 12 wherein said means for frequency analysis includes blanking means to blank the signal generated by said detector means during said return motion.*

*15. The spectrum analysis apparatus as claimed in claim 11 wherein said means for continuously reciprocating said mirror comprise a linear electrodynamic motor.*

*16. The spectrum analysis apparatus as claimed in claim 11 wherein said means for reciprocating provides a speed of said reciprocable mirror during said constant velocity portion of the reciprocating cycle which is at least 0.06 mm. per second, providing an A.C. signal without chopping.*

*17. Spectrum analysis apparatus comprising:*

*a Michelson interferometer including a continuously reciprocable mirror and having a light exit path;*

*means comprising a linear electrodynamic motor for continuously reciprocating said mirror with an excursion exceeding the longest wavelength of the light in said exit path and with a substantially constant velocity of at least 0.06 mm. per second over a major portion of each reciprocating cycle, each said reciprocating cycle comprising a scanning motion and a return motion, said scanning motion taking place at a first velocity and said return motion taking place at a second velocity greater than said first velocity;*

*detector means located in the light exit path of said interferometer for generating a signal in response to the output in said exit path; and*

*electronic frequency analyzer means responsive to said signal, for measuring the amplitude of the various component frequencies making up the output signal from said detector means;*

*said analyzer means including blanking means to blank the signal generated by said detector means during said return motion.*

*18. For use with electronic frequency analyzer means [capable of] measuring the amplitude of component frequencies making up an electrical signal, interferometric appartus comprising:*

*a Michelson interferometer including a continuously reciprocable mirror and having a light exit path;*

*means for continuously reciprocating said mirror with an excursion exceeding the longest wavelength of the light in said exit path and with a substantially constant velocity over a major portion of each reciprocating cycle; and*

*detector means located in the light exit path of said interferometer for generating a signal in response to the output in said exit path, said signal being supplied to said electronic frequency analyzer means.*

*19. The apparatus as claimed in claim 18 wherein said means for reciprocating includes means for providing a scanning motion at a first velocity and a return motion at a second velocity, said second velocity being greater than said first velocity.*

*20. The apparatus as claimed in claim 18 wherein said means for continuously reciprocating said mirror comprise a linear electrodynamic motor.*

*21. The apparatus as claimed in claim 18 wherein said means for reciprocating provides a speed of said reciprocable mirror during said constant velocity portion of the reciprocating cycle which is at least 0.06 mm. per second, providing an A.C. signal without chopping.*

*22. The apparatus as claimed in claim 19 wherein said analyzer means includes blanking means to blank the signal generated by said detector means during said return motion.*

References Cited

The following references, cited by the Examiner, are of record in the patented file of this patent or the original patent.

UNITED STATES PATENTS 2,385,086 9/1945 D'Agostino et al. -- 356—106 R

OTHER REFERENCES

Connes, J. "Recherches sur la Spectroscopie par Transformation de Fourier," Revue D'Optic T. 40, No. 5 May 1961, pp. 231–265., pp., 231–235 only are supplied.

Tolanksy et al.: "An Oscillating Fabry-Perot Interferometer," Symposium No. 11, National Physical Laboratory, Teddington, England, on Interferometry; printed by Her Majesty's Stationery Office, London, Dec. 14, 1960; symposium held on 9th, 10th and 11th of June 1959; pp. 377–386.

RONALD L. WIBERT, Primary Examiner

UNITED STATES PATENT OFFICE

CERTIFICATE OF CORRECTION

Patent No. Re. 27,947 Dated March 26, 1974

Inventor(s) Lawrence N. Mertz

It is certified that error appears in the above-identified patent and that said Letters Patent are hereby corrected as shown below:

Column 3, lines 7 through 9, delete "For driving the mirror there is provided for the mirror and coil.";

Column 3, line 59, "as" should be --are--;

Column 5, line 21, "interfrometer" should be --interferometer--.

Signed and sealed this 6th day of August 1974.

(SEAL)
Attest:

McCOY M. GIBSON, JR.
Attesting Officer

C. MARSHALL DANN
Commissioner of Patents

Disclaimer and Dedication

Re. 27,947.—*Lawrence N. Mertz,* Lexington, Mass. INTERFERENCE TECHNIQUE AND APPARATUS FOR SPECTRUM ANALYSIS. Patent dated Mar. 26, 1974. Disclaimer and Dedication filed Sept. 8, 1980, by the assignee, *Bio-Rad Laboratories, Inc.*

Hereby disclaims all claims and dedicates to the Public the entire term of said patent.

[*Official Gazette October 12, 1982.*]